B. C. STICKNEY.
COMBINED TYPE WRITING AND COMPUTING MACHINE.
APPLICATION FILED NOV. 20, 1911.
1,285,453.
Patented Nov. 19, 1918.
5 SHEETS—SHEET 1.
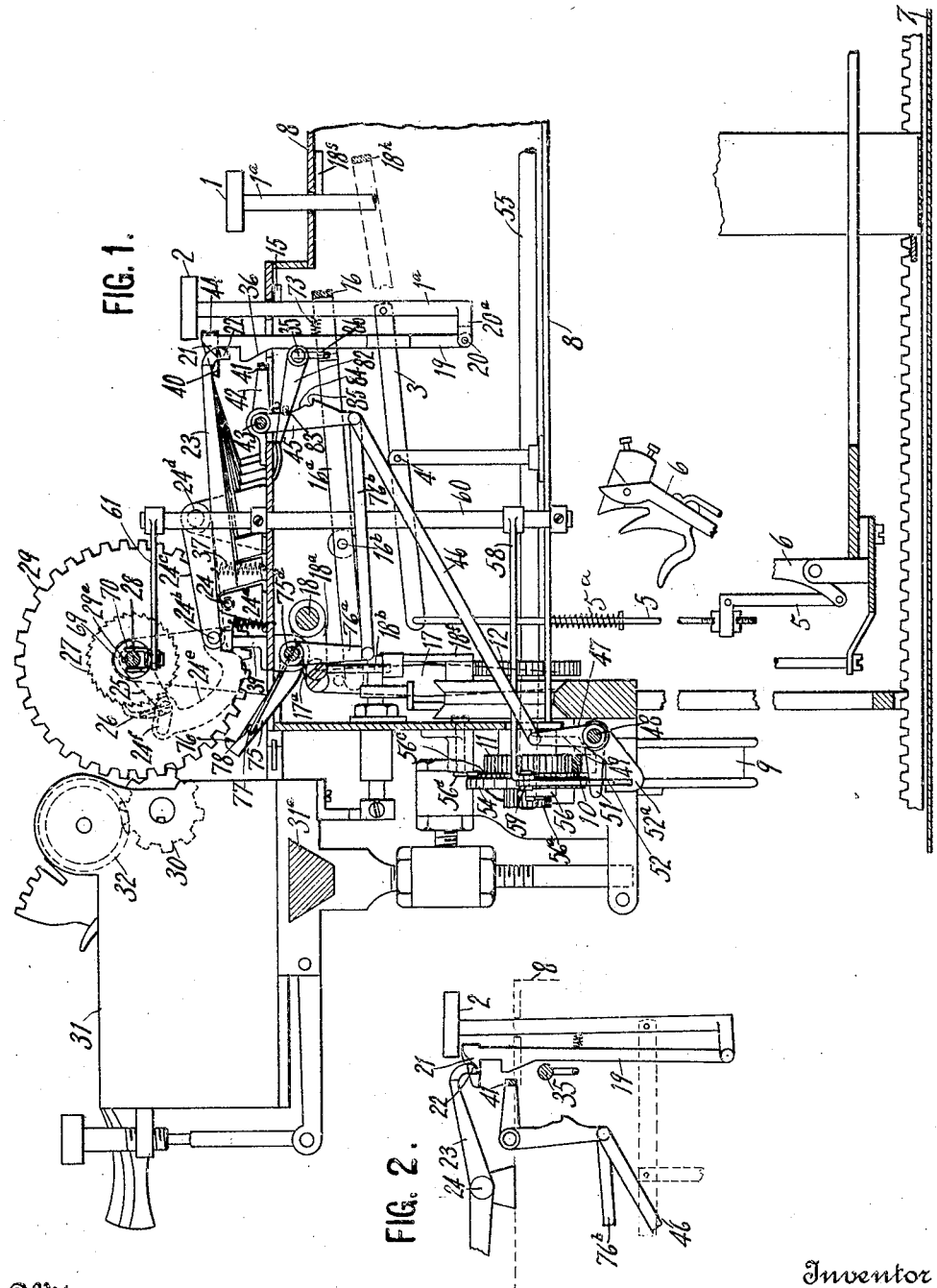
Witnesses
Julius Duchatrie
F. E. Alexander
Inventor
Burnham C Stickney

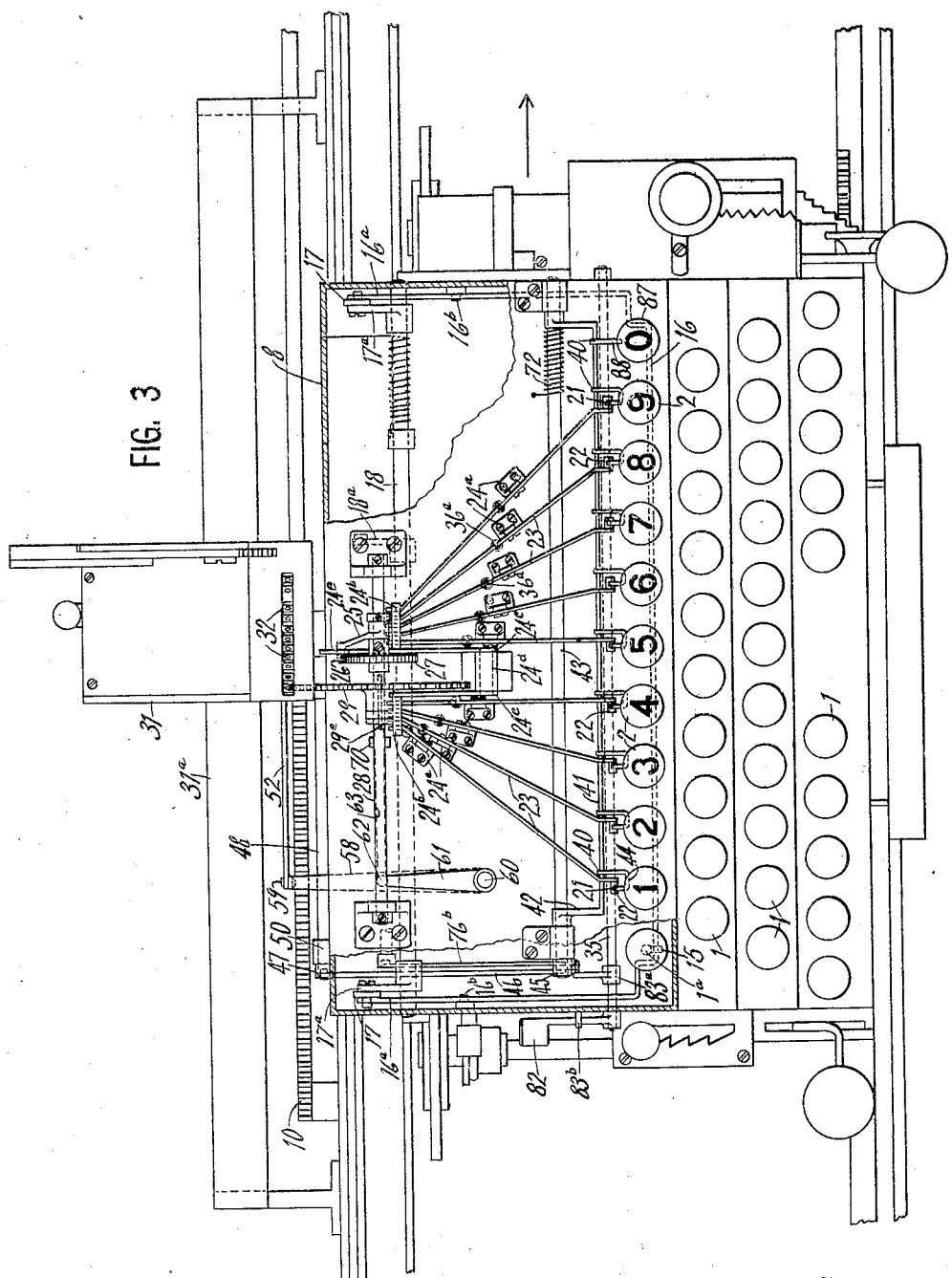

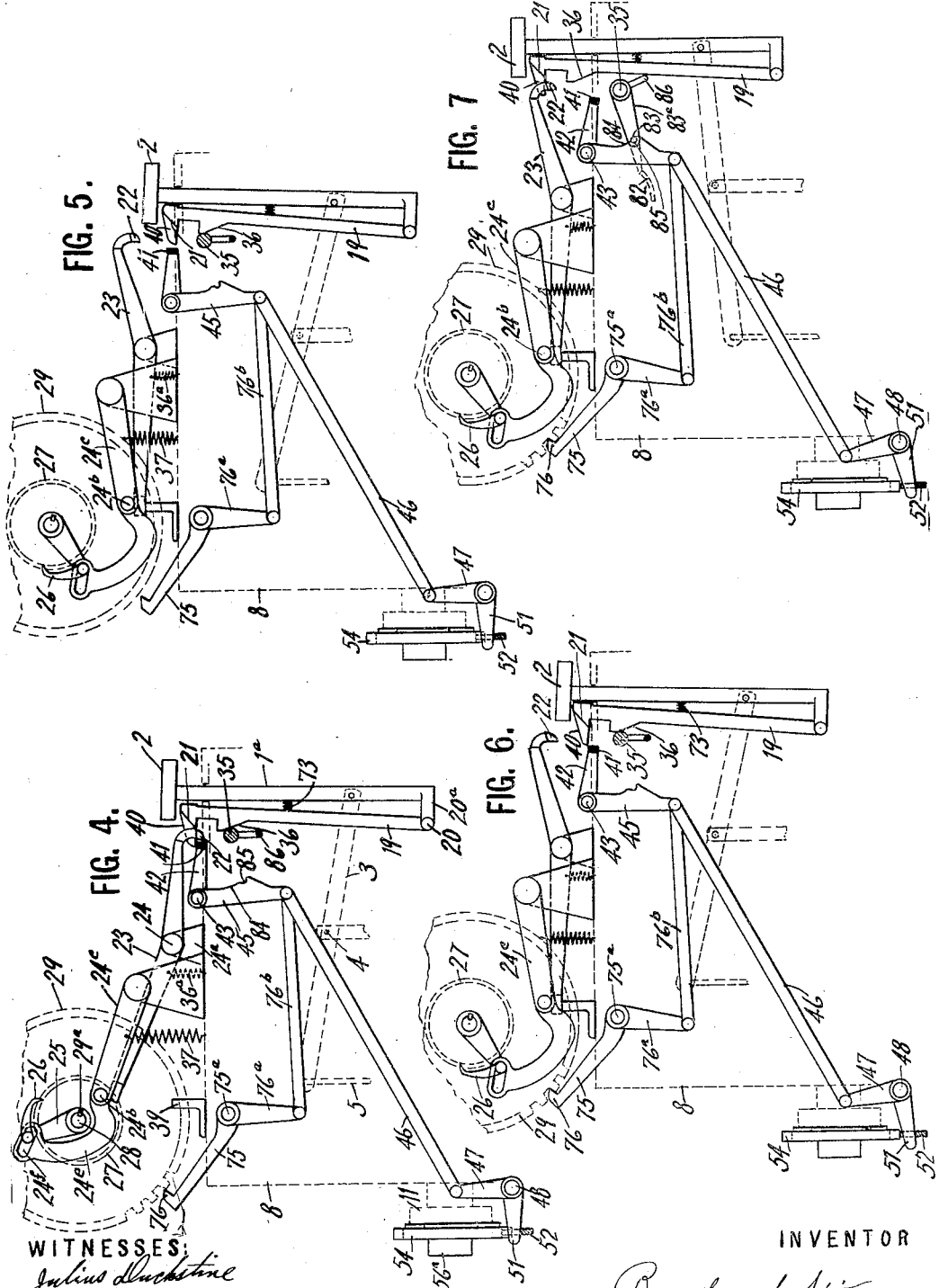

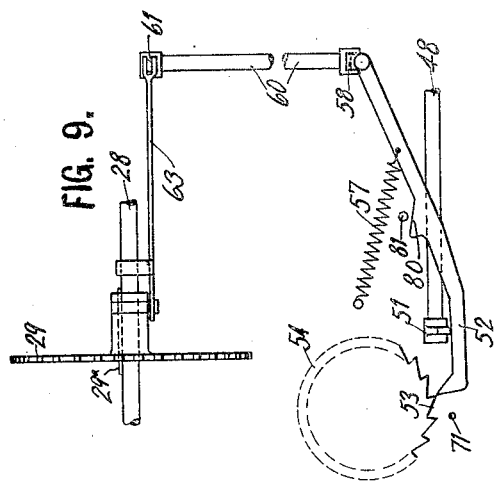
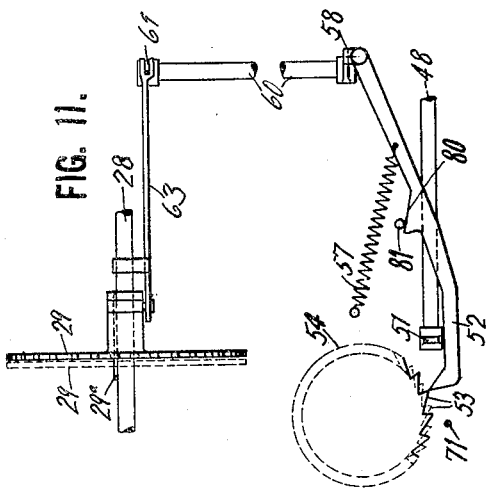
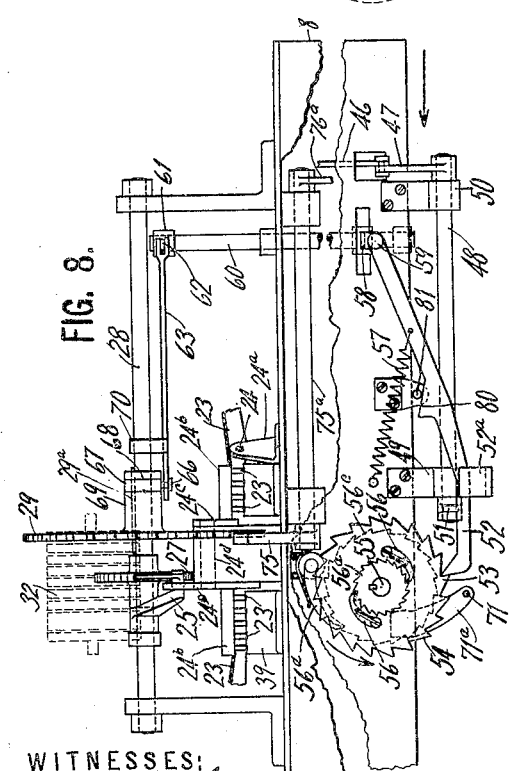
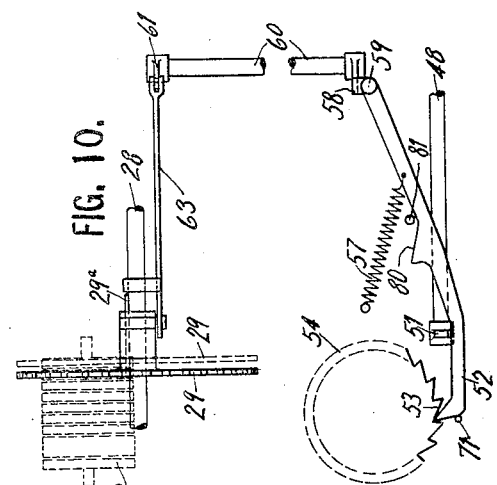

B. C. STICKNEY.
COMBINED TYPE WRITING AND COMPUTING MACHINE.
APPLICATION FILED NOV. 20, 1911.
1,285,453.
Patented Nov. 19, 1918.
5 SHEETS—SHEET 5.
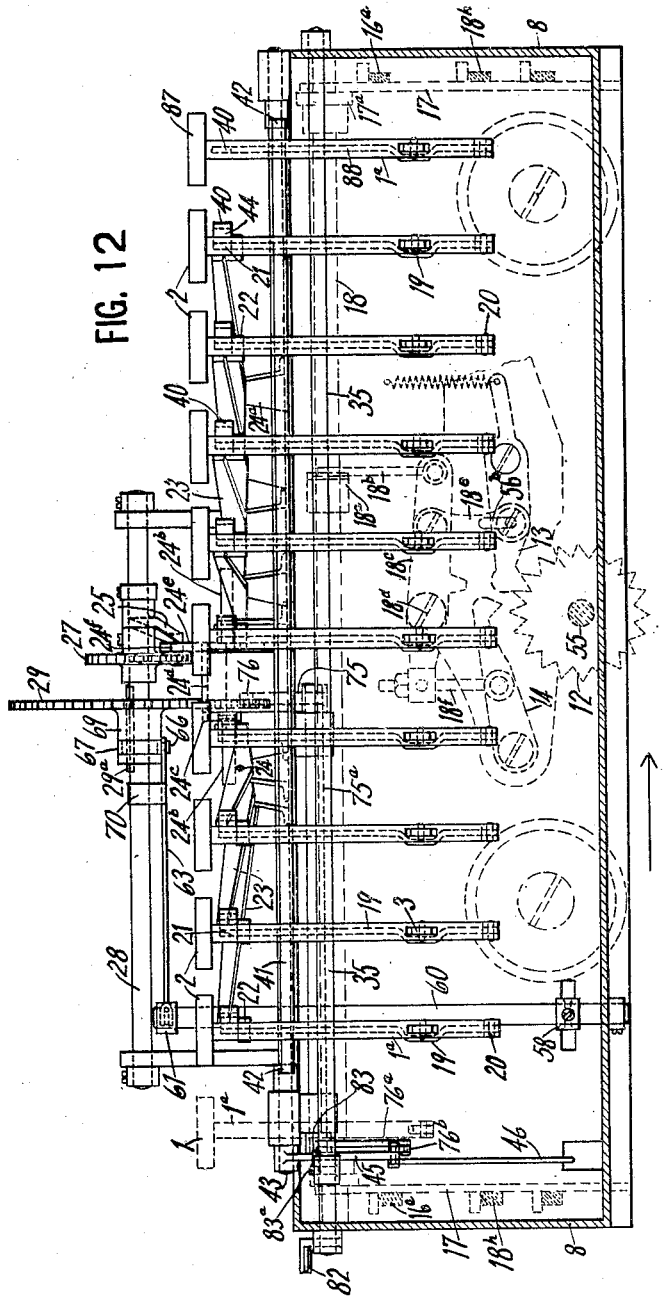
Witnesses
Julius Duchstine
F. E. Alexander
Inventor
Burnham C Stickney

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,285,453.     Specification of Letters Patent.     Patented Nov. 19, 1918.

Application filed November 20. 1911. Serial No. 661,291.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates to combined typewriting and computing machines of the kind in which a relative step-by-step movement is effected between the master wheel and a system of computing wheels concomitantly with the letter-feeding movements of the carriage of the typewriting machine, and in which a rotation or movement of the master wheel or device is effected as each key is operated.

The object of the present invention, which is illustrated in connection with the Elliott-Fisher book typewriting machine, is to provide improved means in this class of machines for overcoming the liability of the master wheel being rotated while the typewriter carriage is in motion, or before it has left one computing wheel and been brought into proper engagement with the next. By means of this device, the necessity is avoided of providing or relying wholly upon stop devices for preventing simultaneous rotation of the master wheel and traveling movement of the carriage.

The improvements are illustrated in connection with a master wheel which is connected up to the letter-feeding carriage to travel therewith, while the computing head does not travel with the carriage; but it will be understood that the improvements are applicable to machines in which the computing head travels step-by-step while the master wheel does not travel with the carriage; or in which both master wheel and computing wheels travel simultaneously, but in opposite directions.

The master wheel is rotated by the finger key during the early part of the key stroke; and after such rotation and before or during the completion of the key stroke, the master wheel jumps to the next computing wheel in the system, that is, to the wheel of next lower denomination, instead of remaining in mesh with the computing wheel which it has just rotated. This jumping of the master wheel is effected automatically and anticipatively, or in advance of the ensuing letter-feeding movement of the carriage, which usually occurs during the return stroke of the numeral key.

Heretofore, in key driven computing mechanisms in this class of machines, it has been the custom for the master wheel to remain in mesh with the dead computing wheel, that is, the computing wheel which it has just rotated, until after the key has returned to normal position, and until after the type-carriage has completed its ensuing letter spacing movement; and hence the master wheel has remained uselessly in engagement with the dead computing wheel for a comparatively long time. According to the present invention, the master wheel immediately leaves the dead computing wheel and jumps to the live computing wheel in advance of the movement of the type-carriage, so that if a succeeding key is depressed before the carriage movement is completed, it will cause the master wheel to rotate together with the computing wheel, even though the master wheel is not traveling with the carriage. Hence faulty operation cannot occur, and the necessity of using complicated interlocking mechanisms is avoided. The master wheel is very light and moves quickly so that it can jump the short distance required before there is any liability of an operation of a succeeding key, and in fact this jumping movement of the master wheel may be completed by the time the first key has finished its down stroke, so there is no liability of clashing of any parts of the mechanism. The master wheel is normally in mesh with the live computing wheel, and, after turning the latter, the master wheel immediately jumps to the next computing wheel, where it remains until the next key has operated, so that there is hardly any interval of time during which the master wheel is in mesh with the dead computing wheel. This saving of time is important not only because it permits speed of operation, but also because it renders it unnecessary to hamper the operator by a system of locks.

I arrange to disconnect the numeral key from the master wheel during the down stroke of the numeral key, preparatory to the jumping movement of the master wheel; and at the last part of the down stroke of the numeral key a spring is caused to advance the master wheel to the next computing wheel; this movement being controlled by the numeral key, which, after effecting this purpose, is disconnected from the master wheel; so that the computing devices are operated and the master wheel is repositioned, and all these parts disconnected from the numeral key by the time it has completed its printing stroke, thus insuring quickness of operation of the automatic mechanism and clearing away for the operation of the succeeding key before the first key has entirely returned to normal position, and before the type carriage has made its ensuing letter feeding movement. The master wheel can perform its function of turning the computing wheel both when the type carriage is stationary and also when the carriage is moving, so that there is a relatively long interval of time during which rotation of the master wheel can perform its function, instead of extremely limited time as heretofore.

The feature of disconnecting the key from the master wheel during the down stroke of the key has further advantages in this type of machines, which may also be employed in machines in which there is no relative anticipative jumping movement between the master wheel and the computing wheels.

Upon the return of the key to normal position, it reconnects automatically with the computing mechanism for effecting a subsequent operation of the latter.

Other objects and advantages will hereinafter appear.

In the accompanying drawings,

Figure 1 is a vertical section taken from front to rear about centrally of an Elliott-Fisher combined typewriting and computing machine, showing the present improvements applied thereto. In this view the parts are in normal positions.

Fig. 2 shows a numeral key returning to normal position after actuation, the trip thereon slipping up past the coöperating projection on the corresponding computing lever.

Fig. 3 is a plan of the machine with the parts in normal positions.

Fig. 4 is a diagrammatic side elevation similar to a part of Fig. 1, but showing the automatic disconnection of the numeral key from the master-wheel rotating mechanism.

Fig. 5 shows a key temporarily at the end of its down stroke while the computing devices have returned to normal positions.

Fig. 6 is a view similar to Fig. 4, but showing the key during its down stroke as tripped from the mechanism which anticipatively jumps the master wheel axially out of engagement with the dead computing wheel and into engagement with the live computing wheel.

Fig. 7 illustrates the computing mechanism as silenced or disconnected from the numeral keys.

Fig. 8 is a rear elevation of the master wheel and certain portions of the computing mechanism, showing the parts in normal positions.

Fig. 9 shows the master-wheel-jumping pawl or dog as released from its coöperating wheel during the down stroke of the key; the position of the parts at this time being seen at Fig. 6.

Fig. 10 illustrates in full lines the anticipative jumping movement of the master wheel effected automatically as soon as the parts reach the positions seen at Figs. 6 and 9; the normal position of the master wheel being indicated by dotted lines.

Fig. 11 illustrates what happens when an alphabet key is employed for printing a type and feeding the carriage; the wheel 54 driving the pawl idly toward the right until cam 80 on the pawl is intercepted by fixed pin 81, thereby causing the pawl to escape from the wheel, and permit it to jump into the next notch thereof under the tension of spring 57.

Fig. 12 is a front elevation of the machine.

Alphabet keys 1 and numeral keys 2 are mounted by stems 1$^a$ on levers 3 fulcrumed at 4 and connected by links 5 to type bars 6, which strike downwardly against a flat platen 7 as usual in the Elliott-Fisher typewriting machine; said type bars and keys mounted on a carriage 8, which is propelled by spring barrel 9 and has a rack 10 meshing with a pinion 11, to which is connected an escapement wheel 12 which is controlled by detent and feeding dogs 13, 14. Each numeral key stem has a lug 15 to press down a universal bar 16, which is carried upon the ends of a pair of levers 16$^a$ fulcrumed at 16$^b$ in the sides of the carriage 8, and at their rear ends engaging vertical links 17 depending from a pair of arms 17$^a$ projecting rearwardly from a rock shaft 18, which rocks at every key stroke; said rock shaft having an arm 18$^a$ connected by a link 18$^b$ to a lever 18$^c$ fulcrumed at 18$^d$ upon the carriage and connected by a link 18$^e$ to the dog 13 and by a link 18$^f$ to the dog 14, all as usual in the Elliott-Fisher typewriter; the dogs operating at every key stroke, in the well known manner, to cause the carriage 8 to feed. The alphabet keys 1 have lugs 18$^g$ to engage other universal bars 18$^h$, the latter connected in the usual manner to the links 17, as indicated at Fig. 12, at the sides of the carriage.

Each of the numeral keys 2, bearing the numbers "1" to "9," is provided with a computing connection 10 pivoted at 20 to a lug 20$^a$ on the key stem, and having at its upper end a hook or nose 21 to catch over one of a series of lugs 22 formed upon the forward ends of computing levers 23 of the first order; the latter all fulcrumed between their ends at 24 upon individual brackets 24ª rising from the top of the carriage 8. These levers 23 are individually operable, and at their rear ends are adapted to lift elongated wrists 24ᵇ provided upon a pair of arms 24ᶜ, which are fixed to a rock shaft 24ᵈ; one arm on each side of the master wheel 29. One of said arms is extended at 24ᵉ, and has a slot 24ᶠ to engage and lift an arm 25 pivoted concentrically to the master wheel 29, and carrying a pivoted driving pawl 26 to mesh with a ratchet wheel 27, which is fixed to a shaft 28 which carries said master wheel 29; the latter being splined to the shaft at 29ª, to permit limited displacement of the master wheel along the shaft for a purpose presently to be explained. It will be seen that aside from such displacement of the master wheel, the master wheel and carriage travel as a unit, viz., they may be said to normally travel simultaneously. Upon the framework of the machine is mounted a gang or set of computing wheels 30, mounted in a fixed casing 31 (which is usually adjustable along a rod 31ª) and meshing with dial wheels 32 so that as the master wheel travels with the carriage or is displaced thereon, it will engage said computing wheels *seriatim*.

The fulcrums of the levers 23 are placed at varying distances therealong; the movements of the forward ends of said levers being uniform, the lever connected to key "1" being fulcrumed so that its rear end has the least movement, the lever for the key "9" being fulcrumed so that its rear end has the most movement, and the remaining fulcrums being placed so as to grade evenly the movements of the remaining levers 23 to correspond with the values of their respective keys; so that when any key is depressed, the arms 24ᶜ are raised to a corresponding extent, and the master wheel 29 is correspondingly rotated, whereby the computing wheel 30 which is at this time in mesh with said master wheel, is revolved a number of teeth or points indicated by the depressed key.

By arranging the levers as shown at their rear ends, to operate the single universal structure 24ᵇ, 24ᶜ, etc., the mechanism is rendered very simple and compact; although certain of my improvements are applicable to machines having other connections between the keys and the master wheels, as for instance such connections as are commonly employed in said Elliott-Fisher bookwriting and computing machines. Any other suitable system of computing wheels and master wheel and means for driving the master wheel may be employed in carrying out the present invention.

Each connection 19, 21 is in the form of a trip, which releases the lug or pin 22 during the down stroke of the numeral key 2. This release may be effected in various ways, as by means of a horizontal trip-bar 35 extending across the machine in the path of a cam or tappet 36 on each trip. When the type bar has nearly completed its printing stroke, the cam 36, by coöperation with the trip bar 35, disengages the nose 21 of the trip from the lug or projection 22, as at Fig. 4; the key not yet having completed its down stroke; and an individual spring 36ª returns the lever 23 to normal position, a spring 37 also returning to normal position the rocking frame 24ᶜ together with the pawl 26; these return movements being effected in advance of the returning of the key 2 to normal position, and the spring 37 holding the frame 24ᶜ down against a stop 39. The movement of the master wheel just effected is of course transmitted through a pinion 30 to a dial wheel 32. The disconnection of the key from the computing mechanism, as aforesaid, conduces to the speed of manipulation of the machine. It also avoids liability of the type bar being checked in its printing stroke by reason of the arrest of the computing devices at the completion of their strokes; since the type bar can continue in action after the key lever 3 has been disconnected from the computing devices.

Said master wheel 29, as soon as it has completed the rotation of the computing wheel, and before the down stroke of a numeral key 2 is completed, moves or starts to move axially to position to engage the live computing wheel, that is, the computing wheel 30 of the next lower denomination to the one that has just been operated. This jumping of the master wheel is initiated by said trip 19, the latter having a second nose or catch 40 to engage a universal bar 41 carried upon arms 42 fixed on a horizontal rock shaft 43 beneath the levers 23. The nose 40 is formed upon an ear 44, Fig. 3, which is folded from the upper portion of the trip 19 and extends alongside of the nose 21. This nose or catch 40 engages and depresses the universal bar 41 as the trip disconnects itself from the projection 22 on the lever 23; so that it is insured that the master wheel 29 shall not jump before its rotation is completed. The position of the parts when the catch 40 is depressing the universal bar 41 is seen at Fig. 4.

When said universal bar is depressed in the manner indicated, a pendant arm 45 fixed upon the rock shaft 43 is swung rearwardly, and, by means of a thrust link 46, swings an upstanding arm 47 on a horizontal rock shaft 48 mounted at the rear of the machine in bearings or hangers 49, 50, Fig. 8, attached to the rear wall of the carriage 8. At its inner end the rock shaft 48 carries a releasing arm 51. This arm is depressed when the shaft 48 rocks in the manner just stated; and during such depression the arm 51 engages and carries down a pawl 52 which is normally in engagement with a tooth 53 of a wheel 54, which is placed upon the shaft 55 which carries the escapement wheel 12 of the usual carriage feeding mechanism. The wheel 54 is loose on the shaft 55, being connected thereto by pawls 56 and ratchet 56ª, so that said wheel 54 may rotate only when the carriage 8 is traveling in letter-feeding direction. The escapement wheel 12 and the shaft 55 rotate idly when the carriage 8 is moved backwardly; a slot-and-pin connection 56ᵇ being provided (Fig. 12) to permit the feeding pawl 13 to be forced out by the escapement wheel 12 while the latter rotates backwardly. Backward rotation of wheel 54 is prevented by ratchet 56ᶜ fixed thereon and pawl 56ᵈ pivoted on carriage 8.

The depression of the pawl 52 carries it down out of engagement with the tooth 53, Fig. 9, and a draw spring 57 snaps the pawl toward the left in said figure to engage it with the next tooth of the wheel 54, which at this time is stationary. Said pawl 52 is connected to the master wheel 29 to jump the latter in axial direction toward the right at Figs. 3 and 12 and toward the left in Figs. 8 to 11 to position to engage the next lower computing wheel or pinion 30. This connection includes an arm 58 to which the pawl 52 is somewhat loosely pivoted at 59; said arm extending horizontally and fixed at its forward end to a vertical rock shaft 60, which may be suitably journaled in the framework of the carriage 8, and at its upper end carries a rearwardly extending horizontal arm 61 pivoted at its rear end at 62 to a link 63, Fig. 8. This link 63 extends along and beneath the master wheel shaft 28, and at its inner end is pivoted at 66 to a collar 67 which is confined in a groove 68 in the hub 69 of the master wheel; said link having a fork 70 to loosely bestride the shaft 28 to restrain the inner end of the link against horizontal displacement. Said hub 69 is splined to the shaft 28, the spline being marked 29ª as before explained. The spring 57 therefore, as soon as the pawl 52 is released from the tooth 53, operates both to engage said pawl with the next notch of the wheel 54 and simultaneously to jump the master wheel 29 out of engagement with the dead computing wheel (which it has just rotated) and into engagement with the live computing wheel; all of this occurring during the down stroke of the key 2, or at about the completion of said down stroke. It is of course not essential that a single spring 57 be employed for both reëngaging the pawl 52 and for causing the arm 58 to swing; and it will be understood also that many other variations may be resorted to within the scope of the invention. A stop 71 in the form of a pin projecting from a bracket 71ª, Fig. 8, prevents overthrow of the pawl 52, Fig. 10, and the master wheel 29 connected thereto.

At the time that the nose or catch 40 of the double trip engages the universal frame 41, the cam 36 is still in engagement with the tripping bar 35, and the cam action continues, so that the catch 40 is caused to release the universal member 41, Fig. 6, at the final portion of the down stroke of the key 2, just before the completion thereof, so that the arm 51 may release the pawl 52, and hence permit the spring 57 to snap said pawl into the next notch of the wheel 54; the return movement of arms 51 and 45 being effected by a spring 72, Fig. 3.

During the last portion of the down stroke of the key 2, the lug or tappet 15 on the stem thereof strikes the universal bar 16, and moves the dog 13 out of mesh with the escapement wheel 12 and the dog 14 into mesh therewith; little or no motion of the type carriage taking place at this time. At the beginning of the return stroke of the key 2, the universal bar 16 is released and the dogs 13 and 14 resume their initial positions at Fig. 12, and the escapement wheel 12 is permitted to turn one tooth, and the carriage 8 to advance one letter space. During this motion of the carriage 8, the wheels 12 and 54, mounted on said carriage, are caused to rotate in the direction shown by the arrow in the rear view at Fig. 8, to the extent of one tooth, and in consequence the pawl 52 is driven by the wheel 54 from the Fig. 10 position to the normal Fig. 8 position; and the master wheel 29, which is also mounted on said carriage, is accordingly driven to the right relatively to said carriage (Fig. 8) until it resumes its normal position on said carriage. Since the carriage itself is in motion during this axial return movement of the master wheel 29, the latter remains substantially stationary in space, and hence in mesh with the stationary live computing wheel, into engagement with which it has just jumped in the manner above explained. The effect of the connections between the wheel 54 and the master wheel 29 is therefore to hold the latter substantially stationary in axial direction while the carriage 8 makes a letter feeding movement.

If another numeral key is started down during the return of the operated key to normal position, it will, therefore, be seen that the master wheel 29 will rotate, and will turn the stationary computing wheel 30 during the travel of the carriage, since all the wheels, including the master wheel, are stationary in axial direction. It often happens that a second key is depressed before the type carriage completes its letter feeding movement; and sometimes the key is half way down before the carriage has made one half of its letter feed on the previous key stroke. Owing to the provision of having the master wheel 29 stationary in axial direction while the carriage is traveling, in the manner stated, no harm results from said premature operation of the second numeral key, because the computing operation will proceed in the proper manner and the type carriage will be in position to make a type impression on the platen by the time that the key is fully depressed. It will be seen that the necessity for relying wholly upon interlocking devices for preventing the carriage from traveling while a computing wheel is turning, and for preventing a computing wheel from turning while the carriage is traveling, is avoided.

As each numeral key 2 returns, a compression spring 73, Figs. 4 to 7, snaps the trip 19 back over the projection 22; said spring operating directly between the trip and the key stem.

At Fig. 1 is shown a yielding arm 75 on a rock shaft 75$^a$; said arm having a locking tooth 76 to engage a tooth or notch of the master wheel 29, Fig. 6, to lock the same temporarily against overthrow at the completion of its rotation by any numeral key 2; said rock shaft 75$^a$ having an arm 76$^a$ connected by a link 76$^b$ to the arm 45, to operate said locking tooth 76 at the depression of the universal bar 41, as seen at Fig. 6. This lock is promptly withdrawn, since the arm 75 returns to normal position simultaneously with the universal bar 41, under the influence of spring 72 as soon as the catch 40 of the double trip is released from the universal member 41 during the down stroke of the key 2. Said arm 75 is loosely mounted on the rock shaft 75$^a$, and a spring finger 77, Fig. 1, projects from said shaft and is caught at its upper end by clips 78 on said arm 75. This spring permits slight additional motion of the universal bar 41 after the engagement of the locking tooth 76 with the master wheel 29. Any other suitable means may be provided for locking the master wheel 29 or the computing wheels 30 against overthrow.

When the type carriage 8 is fed by any of the alphabet keys 1, the wheel 54 forces the pawl 52 toward the right at Fig. 8, together with the arm 58; the rock shaft 60 and the master wheel 29 also partaking of this idle movement. A cam 80 on the pawl is at this time, Fig. 11, intercepted by a releasing pin 81, which is fixed upon the carriage frame 8 and causes said pawl to escape from the wheel 54 at about the time that the latter has made one half of its step-by-step movement, or from the dotted line to the full line position at Fig. 11. Upon such escape, the spring 57 returns the pawl to the left at Fig. 11, and the cycle of movements is repeated for each depression of any alphabet key 1.

If it is desired to disconnect the master wheel from this automatic anticipating feeding mechanism, the pawl 52 can be lifted out of engagement with the wheel 54 and clear of the path of movement of the teeth 53, by depressing a hand lever or finger-piece 82 which is secured on the shaft 35, so as to rock the same. The shaft 35 rocks an arm 83$^a$ also secured thereto, which is provided with a pin 83 engaging a cam 84 formed on the arm 45 so as to force the latter to the left at Fig. 1, thereby swinging down the releasing arm 51 to release the pawl, as at Fig. 9. The finger-piece 82 may be pressed down far enough to carry said pin 83 down into a notch 85 in said arm 45, whereby the arm is locked down and the finger piece 82 is mechanically held against rising.

At the same time the numeral keys 2 may be disconnected from the computing wheels by means of a horizontal bail or rod 86 extending down from the shaft 35 in rear of the trips 19, whereby all of said trips are swung forwardly far enough to disconnect them from the members 22 and 41, as at Fig. 7, so that the numeral keys may be operated without operating the computing devices. Upon returning, the finger piece 82 is arrested by stop 83$^b$.

The key 87, Figs. 3 and 12, which is used for writing a character "0" is not provided with a lever 23, but its trip 88, which corresponds to the trip 19 of the numeral keys "1" to "9", has a nose or catch 40 to engage the universal member 41, so that although the master wheel 29 is not rotated by said key 87, still said master wheel is jumped to the next lower computing wheel when a "0" is written, so that the master wheel is in position to turn the next computing wheel in advance of the completion of the ensuing feeding movement of the type carriage 8.

Many other variations may be resorted to within the scope of the invention, and portions of the improvements may be used without others.

Having thus described my invention, I claim:

1. The combination of numeral keys, a type carriage, a master wheel, a gang of computing wheels, one of said master wheel and gang elements being connected to said carriage, means to enable the numeral keys to drive the master wheel, means for automatically effecting connection between the master wheel and the live computing wheel during the down stroke of each numeral key and after such wheel has been turned by said keys, and independently of the letter feeding movement of the carriage, and means for causing the master wheel to remain stationary and connected with the live computing wheel during the ensuing letter-feeding movement of the carriage.

2. The combination with a type carriage and numeral keys, of stationary computing wheels, a master wheel connected up to the type carriage to travel therewith in the same direction, means for jumping the master wheel automatically to the live computing wheel as soon as it has turned a computing wheel, and means for causing the master wheel to remain substantially stationary and connected with the live computing wheel during the ensuing letter feeding movement of the carriage.

3. The combination with a carriage and numeral keys, of a master wheel connected to the carriage and rotatable by the numeral keys during the early part of each key stroke, means effective after such rotation and before or during the completion of the key stroke, for jumping the master wheel to the next computing wheel in the system, and means to hold the master wheel substantially stationary in axial direction and connected with said next computing wheel during the next ensuing letter feeding movement in the carriage.

4. In a combined typewriting and computing machine, the combination with computing wheels and a carriage, of numeral keys controlling said carriage and carried thereby, a master wheel also carried by the carriage and rotatable by the numeral keys during the early part of each key stroke, means effective after such rotation and before or during the completion of the down stroke of a key for jumping the master wheel to the next computing wheel in the system, means to feed the carriage and keys in a letter-feeding direction as any key begins its up stroke, means to prevent the master wheel from traveling during said movement of the carriage and keys, trip devices between said keys and said master wheel to disconnect the master wheel from the keys during the down stroke of any key and after said keys have driven said master wheel, and means to re-connect said keys and master wheel after said carriage and keys have completed their aforesaid feeding movement.

5. In a computing machine, the combination with a carriage movable step by step, of a master wheel connected thereto for general movement of translation, computing wheels mounted upon the stationary framework of the machine, keys, means to enable the keys to drive the master wheel, and means dependent upon the movement of each key for causing the master wheel to jump to the live computing wheel in advance of the movement of the carriage, and to remain stationary in mesh with said live computing wheel during the ensuing step of the carriage, whereby at the conclusion of the movement of the carriage the master wheel is restored to its normal position with reference to the carriage.

6. In a combined typewriting and computing machine, the combination with computing wheels, a master wheel therefor, a traveling carriage, and alphabet and numeral keys, of a wheel connected to said carriage, a pawl normally in engagement with said wheel and disengageable therefrom by any key, a spring to advance said master wheel to the next lower computing wheel when said pawl is thus disengaged, said pawl connected to said master wheel and moved by said spring into engagement with the next tooth on said carriage wheel, said carriage causing said wheel to restore said spring to normal tension during the ensuing feeding movement of said carriage to control the master wheel axially to hold it in engagement with the live computing wheel, whereby said master wheel may be rotated by the next operated numeral key before said carriage comes to rest, said spring being further tensioned to move said pawl to an abnormal position during each operation of an alphabet key, and a device freely engaging said pawl to move the same out of engagement with said carriage wheel, said pawl when thus disengaged from said wheel moving under the action of said spring.

7. The combination with two primary elements comprising a master wheel and a set of computing wheels, of a letter-feeding carriage connected to one of said primary elements, means for automatically advancing independently of the carriage, the primary element which is connected to said carriage, to effect engagement between the master wheel and the live computing wheel, and means for holding substantially stationary the primary element on said carriage during the ensuing letter-feeding movement thereof to maintain such engagement.

8. In a computing machine, the combination with computing mechanism, a master wheel therefor, and numeral keys for driving said master wheel, of connections from said keys to said master wheel including levers, one for each key, said levers fulcrumed at varying distances, one end of each lever connected to said master wheel, and the other end of each lever adapted to be moved by a key, whereby when any lever is uniformly driven by any key it will drive the master wheel a distance different from that of any other key, and means for disconnecting any key from its lever immediately on completion of the driving action by a key and at the same point for all of the keys.

9. In a computing machine, the combination with computing mechanism, a master wheel therefor, and numeral keys for driving said master wheel, of connections from said keys to said master wheel including levers, one for each key, said levers fulcrumed at varying distances, one end of each lever connected to said master wheel, and the other end of each lever adapted to be moved by a key, whereby when any lever is uniformly driven by any key it will drive the master wheel a distance different from that of any other key, means for disconnecting any key from its lever immediately on completion of the driving action by a key and at the same point for all of the keys, and overthrow-preventing means for said master wheel operated by each key immediately on being disconnected from its lever.

10. In a combined typewriting and computing machine, the combination with computing mechanism and a master wheel therefor, of a letter-feeding carriage, numeral keys for driving said master wheel and controlling the letter-feeding of said carriage, means for driving said master wheel from said keys including levers, one for each key, said levers fulcrumed at varying distances, one end of each lever connected to said master wheel, and the other end of each lever adapted to be moved by a key, whereby when any lever is uniformly driven by any key it will drive the master wheel a distance different from that of any other key, means for disconnecting any key from its lever immediately on completion of the driving action by a key and at the same point for all of the keys, and means for jumping the master wheel to the live computing wheel in anticipation of the feeding movement of the carriage, said jumping means including a bail universal to all of said keys and engageable thereby immediately after any key is disconnected from its corresponding lever.

11. The combination with numeral keys having depending stems, of trips pivoted to the bottoms of said stems, each trip having a hook, levers over which said hooks catch, means to release the levers from the hooks upon the down strokes of the keys, and computing mechanism controlled by said levers.

12. The combination with spaced numeral keys having stems, of trips pivoted to said stems, each trip having a hook, levers over which said hooks catch, means to release the levers from the hooks upon the down strokes of the keys, and computing mechanism controlled by said levers, said computing mechanism including a master wheel and a single controlling member therefor, said levers radiating from said controlling member closely adjacent said master wheel to said trips.

13. The combination with spaced numeral keys having stems, of trips pivoted to said stems, each trip having a hook, levers over which said hooks catch, means to release the levers from the hooks upon the down strokes of the keys, and computing mechanism controlled by said levers, said computing mechanism including a master wheel and a single controlling member therefor, said levers radiating from said controlling member closely adjacent said master wheel to said trips, said levers being fulcrumed each between its ends, and the fulcrums being at varying distances from said ends, to impart to the master wheel varying throws corresponding in extent to the designations upon their respective numeral keys.

14. In a combined typewriting and computing machine including a carriage movable step by step and printing mechanism on said carriage, inclusive of numeral keys, the combination with said numeral keys, of computing wheels, a master wheel to engage said computing wheels *seriatim* to turn them, means for turning said master wheel by said numeral keys, and a device for causing said master wheel to jump to the live computing wheel the moment it completes the movement of one computing wheel and before the ensuing step of the carriage, and to remain stationary in engagement with said live computing wheel during such step.

15. In a combined typewriting and computing machine, the combination with a traveling carriage and a master wheel thereon, of computing wheels arranged to be engaged *seriatim* by said master wheel, a key having a depending stem, a trip pivoted on said stem so as to lie nearly parallel thereto, means controlled by said trip for causing said master wheel to turn the computing wheel with which it engages, for positively arresting said master wheel when it has finished turning its computing wheel, and for causing said master wheel to jump to the adjoining computing wheel, and means whereby at the beginning of the stroke of said key connection is established between said trip and said computing mechanism and is broken before the end of said stroke.

16. In a combined typewriting and computing machine, the combination with a traveling typewriter carriage, of a master wheel connected to travel over a distance of many letter spaces in the same direction as said carriage, and accordant with the movements of said carriage as to distance and direction of travel, a series of computing wheels arranged to be driven *seriatim* by said master wheel, and a series of numeral keys for controlling the movement of said carriage and the rotation of said master wheel, the movements of said master wheel being asynchronous with respect to the corresponding movements of said carriage.

17. In a combined typewriting and computing machine, the combination with a traveling typewriter carriage, of a series of computing wheels, a master wheel connected to keep pace with said carriage in a long travel thereof and moving in the same general direction as said carriage, said master wheel acting to drive said computing wheels *seriatim*, a series of numeral keys for controlling said master wheel, trip connections between said numeral keys and said master wheel, jump-movement mechanism for said master wheel, and trip connections between said numeral keys and said jump-movement mechanism, whereby said master wheel may be jumped independently of the return of said keys to normal position.

18. In a combined typewriting and computing machine, the combination with a traveling typewriter carriage, of a series of computing wheels, a master wheel mounted on said carriage to travel therewith, a series of numeral keys for controlling the extent of rotation of said master wheel, and means for advancing said master wheel relatively to said carriage to bring said master wheel into driving relation with the live computing wheel.

19. In a combined typewriting and computing machine, the combination with a traveling typewriter carriage, of a series of computing wheels, a master wheel mounted on said carriage to travel therewith, a series of numeral keys for controlling the extent of rotation of said master wheel, means for advancing said master wheel relatively to said carriage to bring said master wheel into driving relation with the live computing wheel, and means for enabling said carriage to catch up with the movement of said master wheel so that said carriage and said master wheel will have the same relative position one step in advance of their previous location.

20. In a combined typewriting and computing machine, the combination with a traveling typewriter carriage, of a series of computing wheels, a master wheel mounted on said carriage to travel in the same general manner as said carriage, so as to drive said computing wheels *seriatim*, numeral keys connected to drive said master wheel and to control the movements of said carriage, jump-movement mechanism operated by said numeral keys subsequent to a driving action of said master wheel, to advance said master wheel to the live computing wheel relatively to said carriage and prior to the corresponding movement of said carriage, said jump-movement mechanism arranged to maintain said master wheel substantially stationary in engagement with said live computing wheel during such carriage movement, and locking means actuated by said numeral keys at the termination of each driving action thereof of said master wheel to engage said master wheel and prevent a rotary movement thereof during the advance jumping movement of said master wheel.

21. In a combined typewriting and computing machine, the combination of numeral keys having elongated vertical stems provided with lateral offsets at their lower ends, upstanding vertical trip bars pivoted at their lower ends to said offsets and provided at their upper ends with hooks, computing levers engageable by said hooks, computing mechanism controlled by said levers upon the downward strokes of said keys, and means for subsequently disconnecting said hooks from said levers during the said downward strokes of said keys.

22. In a combined typewriting and computing machine, the combination of numeral keys having elongated vertical stems provided with lateral offsets at their lower ends, upstanding vertical trip bars pivoted at their lower ends to said offsets and provided at their upper ends with hooks, computing levers engageable by said hooks during the downward strokes of said keys, computing mechanism controlled by said levers, and cam means for subsequently disconnecting said hooks from said levers during the said downward strokes of said keys.

23. In a combined typewriting and computing machine, the combination of numeral keys having elongated upstanding vertical stems provided with lateral offsets at their lower ends, vertical trip bars pivoted at their lower ends to said offsets and provided at their upper ends with pairs of hooks, computing members provided with lugs engageable by one of the hooks on the adjacent trip bars upon the downward strokes of the keys, computing mechanism including a master wheel controlled by said members, means for subsequently disengaging said hooks from said members during the said downward strokes of said keys, a universal bar engageable by the other hooks on said bars substantially at the time of the disengagement of the first-named hooks, and master-wheel-positioning mechanism controlled by said universal bar.

24. In a combined typewriting and computing machine, the combination with the carriage and the numeral keys, of a rocking universal bar depressible by said keys, a shaft to which said universal bar is affixed to be rocked by said bar, a thrust link connected with said shaft to be operated thereby, a rock-shaft connected to be operated by said link, an arm secured to the second-named shaft, a ratchet wheel driven from the carriage escapement, a pawl normally engaged with said ratchet wheel and releasable therefrom by said arm, a feeding spring for said pawl to engage the same with the successive teeth of the ratchet wheel, said pawl being shiftable in one direction by said ratchet wheel after having been reëngaged therewith by said spring, a vertical rock-shaft with which said pawl is connected to rock the same when said pawl is so shifted, a shiftable computing element, and a thrust link connecting said computing element with said vertical rock-shaft to jump the former one step at a time when the said vertical rock-shaft is actuated.

25. The combination with a carriage movable step by step, an escapement controlling the carriage movement, and a set of numeral keys controlling said escapement, of a set of computing wheels, a master wheel connected to travel with said carriage and controlled by said keys, means arranged to jump said master wheel to the live computing wheel in advance of the ensuing step of the carriage, and means controlled by said escapement for shifting said master wheel relatively to said carriage during the step of the latter and in the opposite direction to such step, whereby said master wheel is maintained substantially stationary in engagement with said live computing wheel throughout said step.

26. The combination with a carriage movable step by step, a master wheel connected to travel with said carriage, a set of numeral keys for controlling the master wheel, and a set of computing wheels to be driven by said master wheel, of means for automatically jumping the master wheel to the live computing wheel prior to the step of the carriage, and means for moving said master wheel, during such step, relatively to said carriage and in the opposite direction, so as to maintain the master wheel substantially stationary with respect to said live computing wheel, and in engagement therewith, throughout said step.

27. The combination with a carriage movable step by step, a master wheel connected to travel with said carriage, a set of numeral keys for controlling the master wheel, and a set of computing wheels to be driven by said master wheel, of a vertical rock shaft, a connection between one end of said shaft and the master wheel for shifting the latter when the former is rocked, an actuating member connected with the other end of said shaft, a spring connected with said actuating member for jumping said master wheel to the live computing wheel prior to the step of the carriage, and a member connected with said carriage and arranged to operate said actuating member during such step, to move said master wheel relatively to said carriage and in the opposite direction, so as to maintain the master wheel substantially stationary with respect to said live computing wheel, and in engagement therewith throughout said step.

28. The combination with a carriage movable step by step, a master wheel connected to travel with said carriage, a set of numeral keys for controlling the master wheel, and a set of computing wheels to be driven by said master wheel, of a rock shaft, a connection between said shaft and the master wheel for shifting the latter when the former is rocked, a driving member connected with said shaft, a spring connected with said driving member for jumping said master wheel in one direction prior to the step of the carriage to engage it with the live computing wheel, and a toothed member on said carriage coöperative with said driving member to shift the same during the step of the carriage, in the opposite direction to that in which it was moved by said spring, thereby to move said master wheel relatively to said carriage and in a direction opposite to that of the carriage step, so as to maintain the master wheel substantially stationary with respect to said live computing wheel, and in engagement therewith, throughout said step.

BURNHAM C. STICKNEY.

Witnesses:
K. FRANKFORT,
PAUL ZIRON.